United States Patent [19]

Francioni

[11] 3,727,460
[45] Apr. 17, 1973

[54] AUTOMATIC DEVICE FOR MEASURING THE TEMPERATURE OF A MEDIUM FLOWING FROM A CONTAINER

[75] Inventor: Willi Francioni, Lauffohr, Switzerland

[73] Assignee: Gesellschaft Zur Forderung der Forschung an der Eidg Techn. Hochschule, Zurich, Switzerland

[22] Filed: May 15, 1970

[21] Appl. No.: 37,804

[30] Foreign Application Priority Data

May 20, 1969 Switzerland..........................7651/69

[52] U.S. Cl.....................73/343 R, 136/230, 176/19
[51] Int. Cl..........................G01k 1/14, G21c 17/00
[58] Field of Search.....................73/343 R, 349, 340, 73/341, 342; 136/230; 176/19

[56] References Cited

UNITED STATES PATENTS 2,971,041   2/1961   France................................73/343
3,511,091   5/1970   Thome................................73/343

Primary Examiner—Louis R. Prince
Assistant Examiner—Denis E. Corr
Attorney—Woodhams, Blanchard and Flynn

[57] ABSTRACT

An automatic temperature measuring device for measuring the temperature of a medium which flows out from a plurality of separate inner chambers through the end thereof, which inner chambers extend in a container axially parallel to its longitudinal axis. A temperature feeler is movable outside the container in a plane perpendicular to the container axis and can be positioned in front of each end opening of each inner chamber. The temperature feeler is arranged on a link chain which can be bent in only one direction from the extended position, the members of which link chain due to gravity support one another to form a straight arm positioned in the mentioned plane of movement. A guide extends laterally of the container and axially parallel to same and is bent to point into the plane of movement. The guide is rotatable about its axis and the chain can be driven in and out of the guide whereby the temperature feeler is movable in the plane in any circular arc or radius.

10 Claims, 3 Drawing Figures

INVENTOR.
WILLI FRANCIONI

INVENTOR.
WILLI FRANCIONI
BY
Woodhams, Blanchard and Flynn
ATTORNEYS

AUTOMATIC DEVICE FOR MEASURING THE TEMPERATURE OF A MEDIUM FLOWING FROM A CONTAINER

The invention relates to an automatic device for measuring the temperature of a medium which flows from a plurality of separate inner chambers through the end cross section thereof, which inner chambers extend in a container axially parallel to its longitudinal axis.

In a gas-cooled atomic reactor it is of importance to know the changes in condition of the cooling medium, namely in particular at the outlet point from the reaction center or fuel core. This was so far not yet possible in reactor types in which the loading with fuel elements is done from below while the cooling medium flows through the nucleus from the top to the bottom. Therefore, a stationary temperature measuring device capable of measuring the temperature values of the separate gas streams of all cells of the reactor cannot be provided at the lower outlet point because of the need to load the fuel elements at this point. Furthermore, safety requirements limit the possibility for another arrangement of such a measuring device in this zone of the reactor in such a manner that it is necessary to find a new way herefore, which is the goal of the present invention.

Thus, there exists the condition that the measuring device must be operated from a place away from the measuring point, and that the temperature feeler used for the measuring must be placed into an exact position in front of the opening of each cell whereby the respective position must be controllable by an indicator. The device is supposed to be able to automatically register measured values while travelling from one position to another position in order to quickly give information of condition changes in the nuclear fuel by way of the cooling medium.

In order to attain the mentioned purpose, there is provided an automatic temperature measuring device for measuring the temperature of a medium which flows out from a plurality of separate inner chambers through the end thereof, which inner chambers extend in a container axially parallel to its longitudinal axis. A temperature feeler is movable outside the container in a plane perpendicular to the container axis and can be positioned in front of each end opening of each inner chamber. The temperature feeler is arranged on a link end member of a link chain which can be bent only in one direction from the extended position, the members of which link chain due to gravity support one another to form a straight arm positioned in the mentioned plane of movement. A guide extends laterally of the container and axially parallel to same and is bent to point into the plane of movement. The guide is rotatable about its axis and the chain can be driven in and out of the guide whereby the temperature feeler is movable in the plane in any circular arc or radius.

In a preferred embodiment a program controlled drive is associated with each of the chain and the guide for controlling the moving in and out of the chain and the rotation of the guide and therewith the swinging of the chain end member in the plane which is perpendicular to the container axis. The guide for the chain is advantageously a tubular member with a square cross section which has in the quarter circular bent section two oppositely positioned bent and two plane surfaces, and each link member of the link chain carries advantageously on two oppositely positioned sides on the diagonally opposite link member ends at least one guide roller, which rollers slide along the two bent surfaces of the square profile of the guide. In order for the end member of the chain to sweep over the entire zone which corresponds to the cross-sectional surface of the container, the length of the chain must at least correspond to the diameter of the container plus the length of the quarter circular bent section of the guide, and the chain can moreover be extended in any desired manner to the drive for the moving in and out, which drive can be arranged at any distance, by being able to connect its guided end with a hollow member, for example a pipe, which advantageously carries at the drive point on the outside a lead screw, for example a ball spindle, at the counter-threaded piece of which the drive for the oscillating movement of the hollow member and therewith for the driving in and out of the chain can engage. The temperature feeler is advantageously a thermo-couple, and the inlet or lead line for this thermo-couple extends advantageously inside said pipe lengthwise of the chain and along the neutral axis of each link member. Also, the guide which is preferably formed of a profile with a square cross section requires only a length which corresponds to the entirely retracted chain and can, for the purpose of rotation by means of a distantly arranged drive, be connected at its end which is axially parallel to the container with a hollow extension member, for example a pipe. The extension member encloses the hollow member connected to the chain end, which hollow member is also preferably a pipe. The extension member can be provided at its end with a gear element, for example a sleeve which is bevel-gear-toothed on the front side, which sleeve is advantageously engaged through a bevel gear by the drive for causing rotation of the guide.

Further details and advantages of the invention can be taken from the claims, the description and the drawings in which one embodiment of the subject matter of the invention is illustrated as an example.

Figure 1:
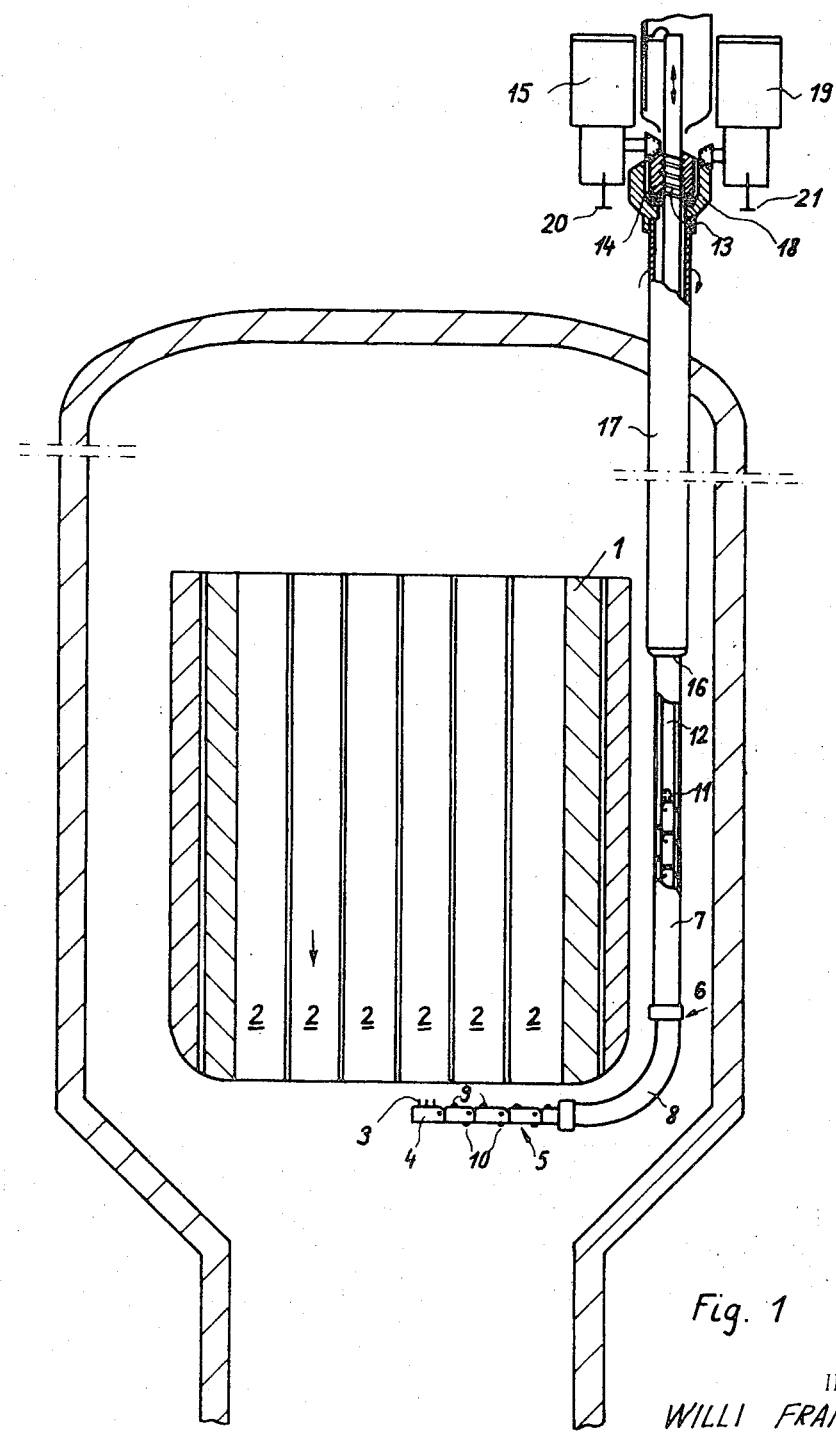
FIG. 1 is a schematically illustrated side-elevational view of the temperature measuring device on a pressure container of a reactor.
Figure 2:
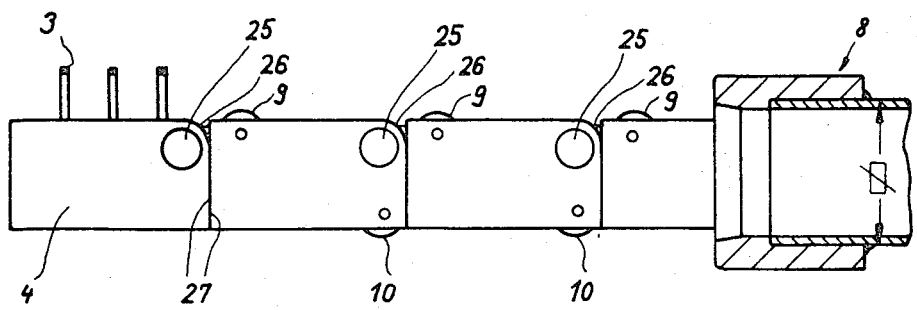
FIG. 2 illustrates on an enlarged scale a link chain and guide of the temperature measuring device according to FIG. 1.
Figure 3:
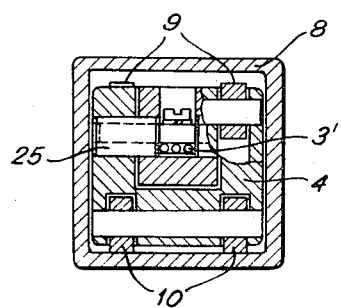
FIG. 3 is an enlarged cross-sectional view of the link chain and guide.

According to FIGS. 1 and 2 a vertically arranged container 1 is divided into a plurality of inner chambers 2 which extend axially parallel to the longitudinal axis of the container. A medium, for example a gas, flows in the direction of the arrow from the top to the bottom through said inner chambers 2 to cool the nuclear fuel elements and discharges through the lower end of each inner chamber. The temperature of such medium is supposed to be measured. For this purpose a temperature feeler, a thermo-couple 3 in the illustrated example, is movable below the container in a plane which is perpendicular to the axis of the container and is arranged on the link member 4 of a link chain 5, which chain can be bent from the extended position only into one direction whereby its links due to gravity support one another to form a straight arm positioned in the horizontal plane of movement. A guide 6 is provided for said chain, which guide extends laterally of the container 1 and axially parallel thereto and consists of a straight section 7 which is axially parallel to the container and of a section 8 which is bent to form a quarter circle. The guide 6 which is formed by the mentioned two sections is a profile tube having a square cross section with two oppositely positioned bent guide surfaces in the quarter circular bent section. The links of the link chain 5 slide along said guide surfaces by means of guide rollers 9 and 10 (FIG. 2) which are arranged on the opposite sides on the diagonally opposite ends of the link member.

The chain must at least be so long that in a fully extended condition the end member 4 comes to lie in front of the opening of the inner chamber which is farthest away from the end of the guide, that thus the chain part driven out from the guide extends over the diameter of the container zone in which the downwardly opening inner chambers are provided and that in this extended position the chain extends through the quarter circular bent section 8 of the guide at least to the lower end zone of the section 7 of the guide, which section is axially parallel to the container. Thereafter the chain is connected at 11 to a pipe 12, which pipe is guided to a drive for the driving in and driving out movement of the chain, which drive can be provided at any distance from the container. A lead screw is advantageously provided for this up and down movement. The lead screw is formed of a ball spindle 13 arranged on the outer periphery of the pipe 12 and a counter-threaded piece 14 in form of a sleeve rotating around the pipe, said sleeve being bevel-gear-toothed on the front side and being engaged through a bevel gear by the drive 15 for causing the chain movement.

The section 7 of the guide 6 with the square cross section, which section is axially parallel to the container, is dimensioned at least so long that the chain 5 can be pulled entirely into the guide 6. For movement of the chain away from the container 1, the guide 7 is connected at 16 to a pipe 17, which pipe 17 encloses the pipe 12 and is provided at its upper end with a sleeve 18, which sleeve 18 is bevel-gear-toothed on the front side and engaged through a bevel gear by a drive 19 for rotating the pipe and the guide connected to said pipe. An indicator 20 and 21 which permits reading each position of the chain and the guide is provided on both drives 15 and 19. The leading of the link members with the thermo-element 3 from one position to the next position is done automatically by suitable controls.

The single members of the link chain as illustrated in detail in FIG. 2 are connected by a link 25 which is provided above the longitudinal axis of the link member so that the inlet leads 3' to the thermo-couple 3 can extend along the neutral axis and each link member has a rounded edge 26 only above said link, which edge permits an upward bending of the entire chain, while the straight side edges 27 of the link members, which side edges rest against one another when the chain is in its extended position, exclude a downward bending of the chain. Through this the chain when driven out from the guide forms a straight arm positioned in the plane of movement, which arm permits measurement of values over the entire surface below the container, which surface must be kept empty for loading of the container and which is not accessible because of the surrounding protective construction.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which I claim an exclusive property or privilege are defined as follows:

1. Automatic device for measuring the temperature of a medium which flows out from a plurality of separate inner chambers in a container through the end of each inner chamber, which inner chambers extend axially parallel to the longitudinal axis of said container, characterized in that a temperature feeler is movable in a plane perpendicular to the container axis and is positionable in front of each end opening of each inner chamber, the temperature feeler being arranged on a link end member of a link chain which can be bent only in one direction from an extended position, the members of said link chain due to gravity supporting one another to form a straight arm positioned in said plane or movement, and a guide for the link chain extending laterally of the container and axially parallel to same and having an end section bent through substantially a quarter of a circle and pointing into said plane of movement, the guide being rotatable about its axis which is parallel to the container and from which guide the chain can be driven in and out.

2. Temperature measuring device according to claim 1, characterized in that drive means is associated with both the chain and the guide for moving the chain in and out of the guide and for rotating the guide about its axis to thereby swing the chain end member within said plane.

3. Temperature measuring device according to claim 2, characterized in that the guided end of the chain is connected to a reciprocating hollow rod, said drive means being disposed externally of the container and connected to the hollow rod for reciprocating same, said drive means including a screw mechanism coacting with the rod for reciprocating same, the screw mechanism including a ball spindle portion provided on the outside of the rod and a counter-threaded sleeve member surrounding the rod and rotated by motor means for causing reciprocating movement of said rod whereby said chain is driven in and out of said guide, and said thermal-couple as provided at the link end member being connected to an inlet lead which extends through said hollow rod.

4. Temperature measuring device according to claim 3, characterized in that the drive means also includes a hollow tube member disposed in surrounding relationship to said reciprocating rod, said hollow tube member having one end thereof connected to said guide, said hollow tube member extending externally of said container and gear means drivingly connected to the external end of said tube member for causing rotation thereof whereby said guide is rotated about its axis.

5. Temperature measuring device according to claim 2, wherein said drive means is disposed externally of said container and includes rotatable means connected to said guide for rotating same, said drive means including reciprocating means connected to said chain for reciprocating same in and out of said guide.

6. Temperature measuring device according to claim 1 characterized in that the temperature feeler is a thermo-couple.

7. Temperature measuring device according to claim 6, characterized in that the inlet lead for the thermo-couple extends through the link members and is arranged along the longitudinal axis of said chain.

8. Temperature measuring device according to claim 1, characterized in that the guide for the chain is a tube with a square cross section which has in the quarter circular bent section two oppositely inclined and two plane inner surfaces.

9. Temperature measuring device according to claim 4, characterized in that each link member of the link chain carries two guide rollers positioned on the diagonally opposite ends of each link member with said guide rollers engaging the two inclined inner surfaces of the guide tube.

10. Temperature measuring device according to claim 1, characterized in that the link chain has a length at least equal to the diameter of the container plus the addition of the length of the quarter circular bent section of the guide.

* * * * *